United States Patent [19]

Eisma, Jr.

[11] 4,056,869
[45] Nov. 8, 1977

[54] WELDED MUFFLER CLAMP

[75] Inventor: Benjamin J. Eisma, Jr., Grand Rapids, Mich.

[73] Assignee: Sparton Corporation, Jackson, Mich.

[21] Appl. No.: 760,812

[22] Filed: Jan. 19, 1977

[51] Int. Cl.$^2$ ............................................. B65D 63/00
[52] U.S. Cl. ..................................................... 24/277
[58] Field of Search ................. 24/275, 276, 277, 278, 24/279; 248/58, 62, 74 R

[56] References Cited

U.S. PATENT DOCUMENTS

| | | |
|---|---|---|
| 3,137,053 | 6/1964 | Osborn et al. ........................... 24/277 |
| 3,955,250 | 5/1976 | Heckethorn ............................. 24/277 |

Primary Examiner—Peter M. Caun
Attorney, Agent, or Firm—Beaman & Beaman

[57] ABSTRACT

A muffler clamp of the type utilized to interconnect telescoping tubular cylindrical members employing U-bolt and saddle. The saddle is formed of a single sheet metal plate folded back upon itself at a rear edge wherein the superimposed portions together define a saddle having a concave, semi-cylindrical, clamping edge and lateral edges. Recesses are formed in the portions to define openings for receiving the legs of the U-bolt. The lateral edges of the saddle are welded with a continuous bead to maintain the saddle assembly.

9 Claims, 5 Drawing Figures

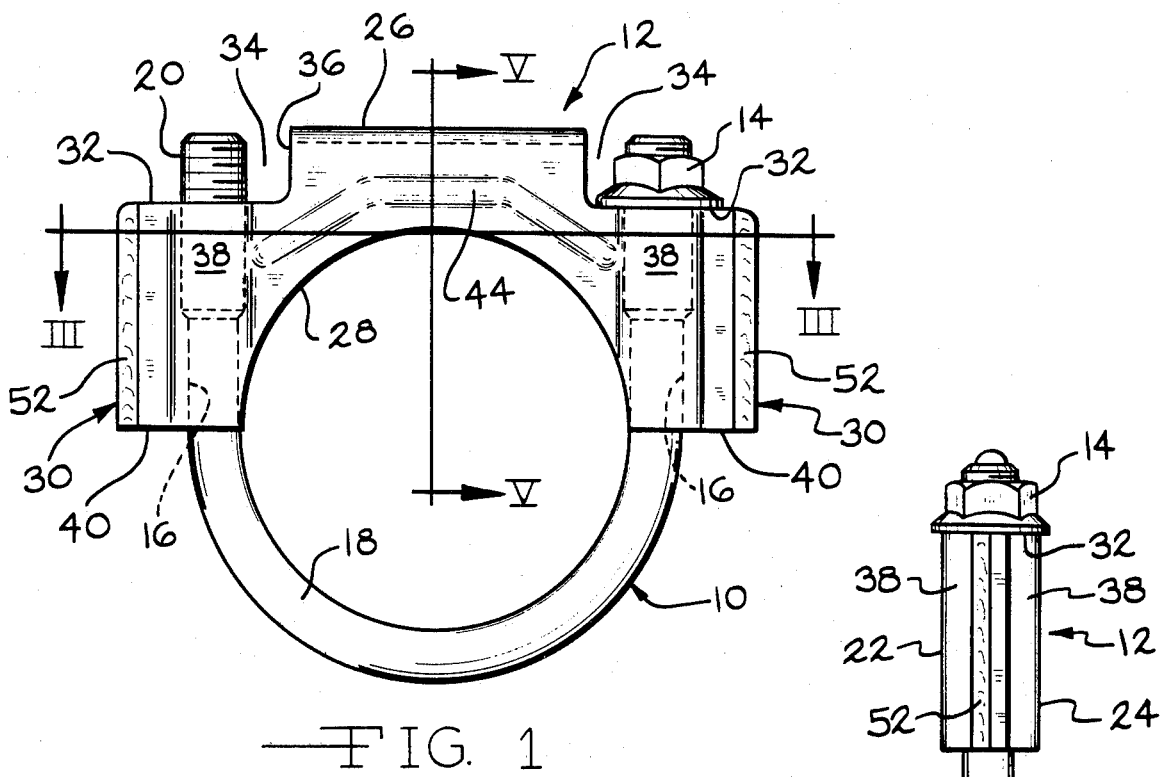
FIG. 1
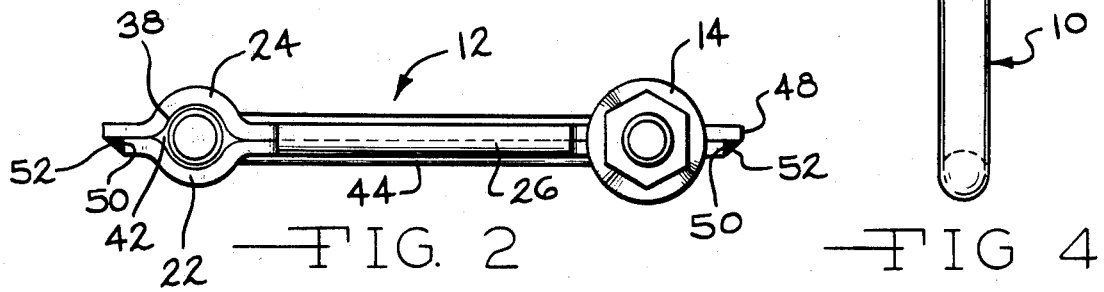
FIG. 2
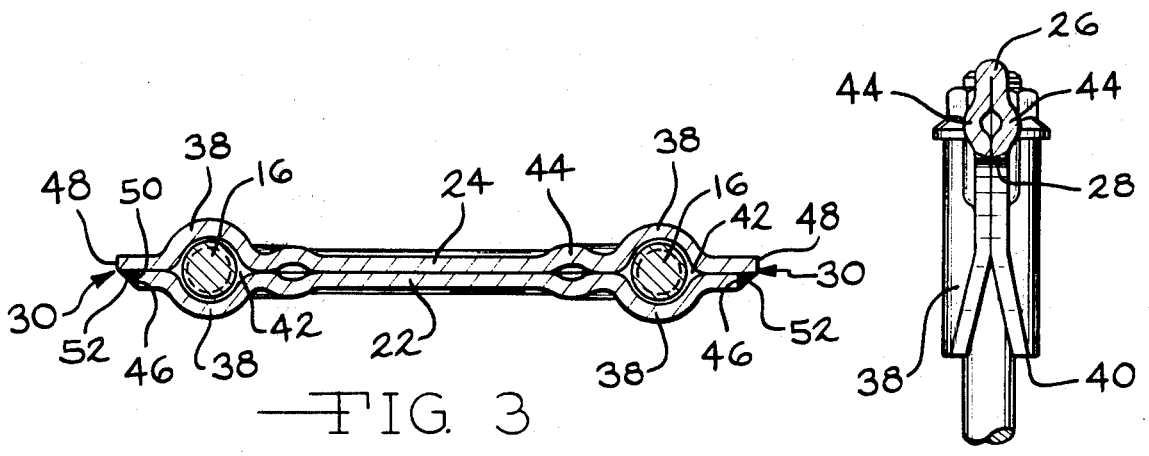
FIG. 4
FIG. 3
FIG. 5

WELDED MUFFLER CLAMP

BACKGROUND OF THE INVENTION

The field of the invention relates to two-piece clamps for encircling cylindrical members to produce a full 360° clamping force, assembly of the clamp parts utilizing threaded fasteners.

Muffler clamps employing U-bolts and saddles are used in the exhaust systems of internal combustion engines to interconnect the various components, such as exhaust pipe, tail pipe, muffler, attenuators and tuners. The U-bolt portion of the clamp consists of a semi-circular base region from which legs extend. The legs extend through openings in the saddle in which an inner, semi-circular, clamping edge is formed in opposed relationship to the bolt base region. Threads formed on the bolt legs permit the bolt and saddle to be drawn toward each other by nuts to achieve clamping.

Two piece muffler clamps of the aforementioned type are required in great numbers as these clamps are used with new exhaust systems and are replaced when old exhaust systems components are repaired or replaced, and a number of construction techniques have been utilized to reduce the cost of manufacturing, yet maintain the required strength and stability characteristics. The saddles may be cast, forged, machined or stamped, and in most high production techniques the saddles are formed of metal stampings wherein the saddle consists of a single or double plate, usually incorporating ribs, folded tabs, or rolled edges to define the various saddle features, such as shown in U.S. Pat. Nos. 3,729,782; 3,772,745; 3,879,815; 3,955,250, and others.

In my co-pending U.S. application Ser. No. 722,366, filed Sept. 13, 1976, I disclosed a sheet metal muffler clamp construction which provides advantages over known devices of similar nature. However, the saddle shown in that application cannot be manufactured by a progressive stamping die due to the presence of folded tabs, and the manufacturing tecnhiques required with sheet metal saddles for muffler clamps of known construction do not permit a continuity of low cost, automatic, manufacture which minimizes costs and yet results in a high strength saddle which effectively resists distortion under high clamping pressures.

SUMMARY OF THE INVENTION

It is an object of the invention to provide a clamp of the muffler type wherein a U-bolt is assembled to a sheet metal saddle consisting of two plate portions interconnected at a folded edge homogeneous with the portions. The saddle is welded along its lateral edges, and the superimposed relationship of the saddle plate portions is maintained by the weld and the folded edge.

An additional object of the invention is to provide a muffler clamp saddle construction consisting of two sheet metal portions defined from a single portion folded over to form a rear edge wherein elongated recesses are formed in the portions which align upon the folding over to form cylindrical U-bolt leg receiving openings, and the portions form lateral edges which are welded together with a continuous bead throughout the lateral edge length.

Another object of the invention is to provide a sheet metal muffler saddle construction wherein the saddle may be formed by a progressive die stamping process such that continuous manufacturing sequences may be performed thereon to result in the desired configuration. The steps of manufacture being such as to result in an economically produced construction of high strength.

In the practice of the invention the saddle may be formed in its entirety by progressive stamping dies, except for the final welding operation, and as the saddle is formed by two substantially identical portions folded over at a rear edge a double strength results and a three dimensional configuration is produced defining substantially cylindrical openings for receiving the U-bolt leg. The plate portions widths are defined by lateral edges, and the width of one of the portions is preferably slightly less than the width of the other whereby a step is defined at the lateral edges permitting an arc weld bead to be laid within the step producing a high strength assembly within the confines of the saddle thickness.

The plate portions defining the saddle are notched adjacent their lateral edges to define nut engaging surfaces of a flat configuration perpendicularly intersecting the saddle lateral edges.

The fact that the saddle plate in accord with the invention can be substantially completely constructed by a progressive stamping operation simplifies and reduces the cost of manufacture, and as the sole secondary operation of welding the lateral edges may be readily accomplished by automatic equipment production costs can be maintained at a minimum for a two-ply stamped sheet metal muffler clamp saddle.

BRIEF DESCRIPTION OF THE DRAWINGS

The forementioned objects and advantages will be appreciated from the following description and accompanying drawings wherein:

FIG. 1 is an elevational view of the clamp of the invention, the bolt and saddle being assembled, and only a single nut being illustrated, FIG. 2 is a top plan view of FIG. 1, FIG. 3 is a plan sectional view taken along Section III—III of FIG. 1, FIG. 4 is an end elevational view as taken from the right hand of FIG. 1, and FIG. 5 is an elevational sectional view as taken along Section V—V of FIG. 1

DESCRIPTION OF THE PREFERRED EMBODIMENT

The clamp in accord with the invention consists of a U-bolt, generally indicated at 10, a saddle 12, and a pair of nuts 14, only one of which is shown, the left nut in FIG. 1 being omitted for purpose of illustration. The U-bolt 10 consists of a pair of leg portions 16 of linear configuration extending from a semi-circular base portion 18 which subscribes 180° of a circle, and the leg portions are tangential to the base portion and are threaded at their outer end in the conventional manner. The threaded portion 20 of the U-bolt may be of a slightly greater diameter than the base portion, as illustrated, or the leg portions may be of the same diameter of the base region.

As a muffler clamp of this type is utilized to produce a 360° circumferential clamping force the remaining 180° of engagement is produced by the sheet metal saddle 12 mounted upon the U-bolt 10 and capable of being drawn toward the base portion 18 by the nuts 14 threaded upon the bolt legs. The saddle 12, in accord with concepts of the invention, is of a simplified stamped steel construction wherein the saddle may be formed by progressive stamping dies in an economical manner to produce high strength, rigidity and resistance to deformation by manufacturing techniques of the automated type wherein the need for secondary operations is minimized. Basically, the saddle is formed by folding preformed sheet metal portions 180° about an edge wherein the portions are substantially identical in configuration, and the folded edge extends a length only slightly less than the diameter of the cylindrical member being clamped. The saddle portions are formed with elongated semi-cylindrical recesses or grooves, wherein the folding back of the portions upon each other defines U-bolt leg receiving openings as the grooves are aligned in a close opposed relationship. Further, the widths of the saddle portions are defined by linear lateral edges, and in the preferred embodiment the width of one portion is slightly less than the width of the other wherein a step is defined adjacent the portions' lateral edges after folding over for receiving a continuous weld bead. The combination of the weld beads at the portions' lateral edges and the folded edge maintains a rigid superimposed assembly of the saddle portions capable of producing the desired clamping forces without distortion.

In its assembled form the saddle 12 includes the superimposed, contiguous sheet metal portions 22 and 24, FIG. 3, homogeneously interconnected at the folded rear edge 26. The saddle includes a semi-circular inner edge 28 of a substantially 180° configuration which will be related in opposed relationship to the U-bolt base portion 18. The edge 28 is radiused at its edges to define a convex surface having a cross-sectional configuration substantially corresponding to that of U-bolt portion 18. The saddle further includes spaced, parallel lateral edges 30, and nut engaging surfaces 32 disposed perpendicular to the adjacent lateral edges 30, and nut engaging surfaces 32 disposed perpendicular to the adjacent lateral edges and defined by notches 34 formed in the plates 22 and 24. The notches 34 are formed by the nut engaging surfaces 32, and the surfaces 36 perpendicularly intersecting the rear folded edge 26.

In the saddle plate regions adjacent the lateral edges 30 the portions 22 and 24 are deformed from the plane of portions to define elongated, semi-cylindrical recesses or grooves 38, FIG. 3. The recesses 38 intersect the nut engaging surface 32 of each saddle plate portion, and also intersect the lower edges 40 of the portions. Each portion 22 and 24 is formed with a pair of recesses such that upon the folding over of the portions 22 and 24 about the edge 26 two of the recesses adjacent associated saddle lateral edges 30 will align to form an elongated substantially cylindrical opening 42 of a diameter sufficient to slidably receive a U-bolt leg 16.

In order to increase the strength and resistance to deformation of the saddle portions 22 and 24, each portion is provided with an outwardly deformed embossment 44 to define a rib extending from the general plane of the associated portion, and the embossments in each portion are aligned in opposed relationship as will be appreciated from FIG. 5.

The width of the portion 22 is defined by lateral edges 46, and as will be appreciated from FIG. 3, the lateral edges 46 are not separated by as great a distance as the lateral edges 48 of portion 24 whereby, a step 50 exists at the saddle lateral edges 30, and a continuous arc weld bead 52 is received within the step. The step 50 permits the weld bead to be incorporated within the width of the saddle as defined by the plate portions, and provides adequate surface area for producing the welded joints.

In the manufacture of the saddle 12 the portions 22 and 24 are stamped from a sheet of steel approximately ⅛ inch in thickness. The surfaces forming the notches 34, lateral edges 46 and 48, edges 40 and inner edge 28 can all be formed in this stamping action. Further, during the progressive stamping of the portions 22 and 24 the recesses 38 are formed, as are the embossments 44. After forming, by progressive stamping dies, the portions 22 and 24 are folded over upon each other about the edge 26 to relate the recesses 38 and lateral edges to each other as shown in the drawing. Thereupon, the lateral edges 46 and 48 are welded together along the step 50.

It will be appreciated that the described saddle construction provides a simplified sequence of manufacture which minimizes secondary operations and permits progressive stamping dies to form the necessary shapes.

Preferably, the welding of the lateral edges 46 and 48 is as described wherein portion 22 has a lesser width than portion 24 in order to form the step 50. However, it is to be appreciated that it would be possible to have the portions 22 and 24 of equal width, but vary the length of the extension between the recess 38 and the associated lateral edge whereby the step adjacent each saddle lateral edge will be on the opposite side of the saddle. It is also appreciated that it would be possible to spot weld the lateral edge 46 and 48 together, but the continuous bead 52 is preferred.

It is also to be noted that by forming the saddle edge 28 with a convex cross section substantially corresponding to the radius of the U-bolt portion 18 the unit area of contact of the saddle on the tube being clamped is the same as the unit area of contact by the portion 18 and, thus, the clamping pressure of the clamp will be substantially uniform throughout the circle defined by the edge 28 and portion 18.

Various modifications may be apparent to those skilled in the art without departing from the spirit and scope of the invention.

I claim:

1. A clamp for tubular cylindrical members comprising, in combination, a U-bolt having a pair of parallel, threaded legs interconnected by a base portion of a semi-circular configuration, a sheet metal saddle bridging said legs having a pair of spaced, parallel elongated openings for receiving said legs, said saddle including an inner edge of a concave circular segment configuration in opposed relation to said base portion, spaced lateral edges and a rear edge intermediate said openings, a notch defined in said rear edge adjacent each lateral edge defining a nut engaging surface, said openings each intersecting a notch and nut engaging surface, said saddle comprising first and second portions of sheet metal folded back upon itself at said rear edge, said openings being defined by elongated semi-cylindrical recesses defined in said portions aligning to define cylindrical openings upon said portions being folded upon each other, weld means interconnecting said first and second portions at said lateral edges, and nuts threaded upon said legs engaging said nut engaging surfaces.

2. A clamp for tubular cylindrical members as in claim 1 wherein said weld means comprises a continuous weld bead at said saddle lateral edges.

3. A clamp for tubular cylindrical members as in claim 2 wherein the maximum lateral width of said first portion is greater than the maximum lateral width of said second portion whereby a step is defined by said portions adjacent each of said lateral edges, said weld bead being located at said step.

4. A clamp for tubular cylindrical members as in claim 1, a reinforcing embossment defined in each of said portions intermediate said rear folded edge and said saddle inner edge.

5. In a clamp for tubular cylindrical members as in claim 1 wherein said U-bolt base portion is of a transverse cross-sectional circular configuration, and said saddle inner edge is of a transverse cross-sectional configuration defining a clamping surface radius substantially equal to the radius of said U-bolt base portion.

6. A saddle for a clamp for tubular cylindrical members comprising a sheet metal member having a rear edge, a concave semi-circular inner clamping edge, and spaced parallel lateral edges substantially perpendicularly disposed to the length of said rear edge, an elongated U-bolt leg receiving opening defined in said member adjacent and parallel to each lateral edge, and a nut engaging surface defined on said member adjacent and substantially perpendicular to each lateral edge and intersected by an opening, said member being defined by first and second plate portions folded over on each other at said rear edge, said portions each having a width defined by lateral edges, a pair of said portions lateral edges being disposed adjacent each other and defining said members lateral edges, and a weld bead welding adjacent portion lateral edges together.

7. In a saddle for a clamp as in claim 6 wherein said weld bead is continuous along said members' lateral edges.

8. In a saddle for a clamp as in claim 7, wherein the width of said first portion is greater than the width of said second portion whereby adjacent lateral edges of said first and second portions define a step at each of said members' lateral edges, said weld beads being within said steps.

9. In a saddle for a clamp as in claim 6 wherein said concave inner clamping edge has a transverse, cross-sectional convex clamping surface.

* * * * *